United States Patent [19]
Hahn

[11] Patent Number: 4,615,849
[45] Date of Patent: Oct. 7, 1986

[54] METHOD AND DEVICE FOR SINTERING DIFFERING MOLDED PARTS IN PARTICULAR FROM VARIOUS TYPES OF FOAMING PLASTIC IN PARTICULAR

[75] Inventor: Ortwin Hahn, Paderborn, Fed. Rep. of Germany

[73] Assignee: Sodemape Holding AG, Luxembourg

[21] Appl. No.: 555,867

[22] Filed: Nov. 28, 1983

[51] Int. Cl.$^4$ .................. B29C 67/22; B29C 67/04; C08J 9/22
[52] U.S. Cl. .................. 264/40.4; 264/40.6; 264/51; 425/4 R; 425/144; 425/145; 425/149
[58] Field of Search .................. 264/51, 40.6, 53, 40.4, 264/DIG. 9; 425/4 R, 144, 149, 145, 146

[56] References Cited

U.S. PATENT DOCUMENTS

| | | | |
|---|---|---|---|
| 2,041,377 | 5/1936 | Schwarz | 264/124 |
| 2,066,993 | 1/1937 | McCombs | 264/124 X |
| 3,773,445 | 11/1973 | Kernen | 264/40.6 X |
| 3,801,244 | 4/1974 | Eisenberg | 264/40.6 X |
| 3,837,769 | 9/1974 | Erlenbach | 425/4 R |
| 4,260,353 | 4/1981 | Buchert | 264/51 |
| 4,260,355 | 4/1981 | Rohig | 264/51 |
| 4,261,939 | 4/1981 | Wilsson | 264/51 |
| 4,264,544 | 4/1981 | Wilheim | 264/51 |
| 4,298,324 | 11/1981 | Soulier | 264/51 X |
| 4,327,045 | 4/1982 | Nishikawa et al. | 264/51 |
| 4,352,895 | 10/1982 | Hilterhous | 264/51 |
| 4,421,468 | 12/1983 | Bokelmann | 264/40.6 X |
| 4,424,180 | 1/1984 | Llaloz | 264/51 |
| 4,445,837 | 5/1984 | Cisar | 264/51 |
| 4,456,443 | 6/1984 | Rabotski | 264/40.6 X |
| 4,482,306 | 11/1984 | Hahn | 264/40.6 X |

OTHER PUBLICATIONS

*Webster's New Collegiate Dictionary*, Springfield, Mass., G. & C. Merriam Co., publ., c 1961, p. 902.
Ferrigno, T. H., *Rigid Plastics Foams*, New York, Reinhold Publishing Corp., c 1963, pp. 150-166.
Bender, Rene J. *Handbook of Foamed Plastics*, Libertyville, Ill., Lake Publishing Corp., c 1965, pp.255-269.
*Whittington's Dictionary of Plastics*, by Lloyd R. Whittington, Stamford, Conn., Technomic, c 1968, preface, p. 38.

Primary Examiner—Philip Anderson
Attorney, Agent, or Firm—Sprung Horn Kramer & Woods

[57] ABSTRACT

A method of molding foaming plastics in consecutive process cycles. The method includes directing foaming plastics to molding means for molding and sintering. The molding means are appropriate to form different molded items. The molding means communicates via an installation means with a supplying means. The supplying means serves to supply under the control of a control means, steam for heating, cold water for cooling, vacuum for providing suction and compressed air as needed to the molding means. The molding means has at least one pressure sensor means and/or temperature sensor means. The pressure sensor means and/or the temperature sensor means are connected to the control means. The control means continuously compares the pressure values sensed by the pressure sensor means and/or the temperature values sensed by the temperature sensor means during each process cycle with associated given pressure values and temperature values stored in the control means and based on said comparison the control means releases appropriate control signals to the supply means. The control means has storage means for storing values of control signals of earlier process cycles. The control means compares said values of earlier process cycles. The control means further comprises a storage for resulting cycle time lengths of the control signals of earlier process steps being restored process cycle by process cycle and the control means compares the last resulting lengths of the control signals to earlier cycle time lengths of the corresponding control signals and sets the related given stored values in the direction of decreasing the total process cycle time for the next cycle thereby watching given upper and lower limits of the given values and the given time limits for the control signal lengths.

5 Claims, 11 Drawing Figures

METHOD AND DEVICE FOR SINTERING DIFFERING MOLDED PARTS IN PARTICULAR FROM VARIOUS TYPES OF FOAMING PLASTIC IN PARTICULAR

BACKGROUND OF THE INVENTION

The invention concerns a device for sintering differing molded parts in particular from foaming plastic in a form tool that is appropriate for each, that communicates with a device that can be controlled and that supplies media like foaming plastic, steam, cold water, vacuum, and compressed air as needed, that has at least one pressure transducer and/or temperature transducer mounted on its mold wall and connected on its input side to controls that constantly compare the actual pressure and temperature with an associated given value and release appropriate control signals to the supply device depending on the results of the comparison and on given time values.

Simultaneously manufacturing differing molded parts in devices of the aforesaid type in accordance with the various shapes that are separately inserted in a device is known. The foaming material is supplied from a central supply device to the tool's injectors and the supply of heating, sintering, and cooling media and of the pressure medium that opens and closes the mold is controlled in accordance with time data and the comparison of pressures or of heating and/or cooling temperatures with reference values obtained by tests conducted by the controls by appropriately opening and closing valves in the supply device.

The reference temperatures for heating or cooling the wall of the mold and the level of pressure that determines the sintering time are always valid for only a specific starting material. When there is a transition to another starting material, which is necessary at various times in practice, it is necessary in order to optimize the time intervals and energy consumption to decrease step by step, beginning with excessively long times during further operating cycles, down to minimum times that can be obtained with an economically reasonable expenditure of energy and to do so while retaining relationships in which sintering and cooling will be adequate. These series of tests have proved to be very expensive.

The method is also limited by the capacity for processing only one type of starting material at one time in the various molds because, although timing control based on comparisons of pressure and temperature can indeed deal with the various shapes of the molds employed at one time in the device, it cannot take various materials into account.

SUMMARY OF THE INVENTION

The object of the present invention is to disclose a device that enables differing molded parts in particular, with defined and reproduceable subsidiary shape properties, to be sintered, preferably simultaneously, from various types of foaming plastic, always striving for the optimum with respect to the material employed and, in heating, sintering, and cooling, with respect to processing time and energy consumption, taking into account the attainment of defined product properties.

This object is attained in that the controls contain a memmory in which material data relating to each plastic to be processed and mold parameters for each form tool to be employed are stored and from which the controls determine the given values.

It is practical for the material-specific reference values to be determined from material data like softening temperature, propellant content, powder density, molecular weight, pourability, bead size, and relative moisture. Specifically, the temperature of the sintering steam, the sintering temperature of the wall of the mold, foam pressure, the pressure-reduction reference value, closing temperature, gap widths, and the demolding pressure and temperature are determined and given in order to obtain intensified sintering as well as adequate hardening prior to demolding and so that the castings will not distort subsequently.

Since material data are subject to considerable variations in tolerance at delivery and since moisture and propellant content for instance vary in accordance with prefoaming and intermediate storage and over the course of one working day for example, a practical further development is the determination of parameters from the measured temperature and pressure levels during processing than can be employed for the continuous determination of the reference values or their corrections. These parameters and the new reference values are practically compared with given material-specific limiting values and/or means and to forward excesses or deviations to materials supply in the form of alarm or control signals. This enables the tolerances in materials properties as well as fluctuations in the states of the other supply media and the various states of the mold during start up and continuous operation to be compensated by the operating controls so that castings with extensively the same subsidiary shape properties that at least correspond to given parameters, with a particular density, rigidity, maximum moisture content, and consistency of shape, that is, can be produced without unnecessarily prolonging processing time, increasing energy consumption excessively, or demanding extremely narrow tolerances in the starting-material data. Monitoring of the overall process in also provided.

The form-specific time constants are practically determined by running calibration processes without using up any material and with defined standard material or material with limiting properties. To eliminate the tolerances and chronological variations in the media states it is practical to measure, on the one hand, the state data of the media before it enters the form tool and after it leaves the form tool and, on the other, the pressure and temperature in the cavity inside the mold or in the wall surrounding the cavity and to evaluate the corresponding differences. From the thermal behavior of the wall of the mold over time is obtained a mold parameter that leads in conjunction with the material parameters to determination of the heating and cooling periods.

If the state sensors are not directly positioned directly at the form tool on the input and output sides but on the supply equipment, upstream of the installation lines, valves, etc., that is, an additional installation-specific plant or machine parameter will always participate in the the mold parameter. This can be determined separately in a short circuit without the mold to determine the exact mold parameter.

From the once determined mold parameters and the continuously determined material parameters a continuous determination of the optimal operating parameters is to obtain specific subsidiary shape properties. This is actually a rule in accordance with which on the one hand the requisite subsidiary shape properties in the form of limiting conditions and on the other process time and energy consumption in the form of measurement principles serve as a criterion of optimization.

A further embodiment of the device consists in that several separate supplies of different materials, of different densities, softening temperatures, or colors in particular, are associated with form tools that are in the device at the same time and the the various associated materials data, from which the reference values are determined in association with form tools with particular mold parameters, are accordingly stored in the memory in the controls. Optimization takes into account that materials with low softening temperatures that is to be manufactured in a more simple process demands a longer cooling time or higher energy consumption when being processed into a casting. Such material is accordingly preferably employed for thin-walled, relatively rapidly cooling casting in the simultaneous manufacture of differing castings.

To further increase the precision of the determined reference values it is practical to employ temperature and pressure transducers at several points on the wall of the mold and in the incoming and outgoing supply lines.

To keep the cost of doing this so low, it is practical to employ known transducers that immediately supply measurement data to their line connections and preferably have a call-up memory so that all the transducers can be powered and polled with one two-line system.

Another practical embodiment of the invention has media flowmeters in the supply device so that the consumption of steam, compressed air, vacuum, etc. can be continuously measured and, especially in running the calibration process, the specific amounts of media consumed by the molds can be determined in the form of mold parameters that can be exploited as a basis for optimization.

Measuring devices for detecting the subsidiary shape properties of the finished castings are also present. Their measurement data are used for feedback and for comparison with given subsidiary shape properties, with corrections in the course of the process being initiated from the results of the comparison when impermissible deviations occur, so that the process is self-optimizing.

A further practical embodiment of the device and method includes a swelling device that is always positioned directly in front of the injectors and always controlled in such a way that the materials data like powder density and moisture content always conform to the demands of the particular optimum sintering process and subsidiary shape properties.

The drawing illustrate a device that is especially appropriate for carrying out the method and the chronological development of the situation data and process steps and the connections between measured data and process parameters.

DETAILED DESCRIPTION OF THE INVENTION

Figure 1:
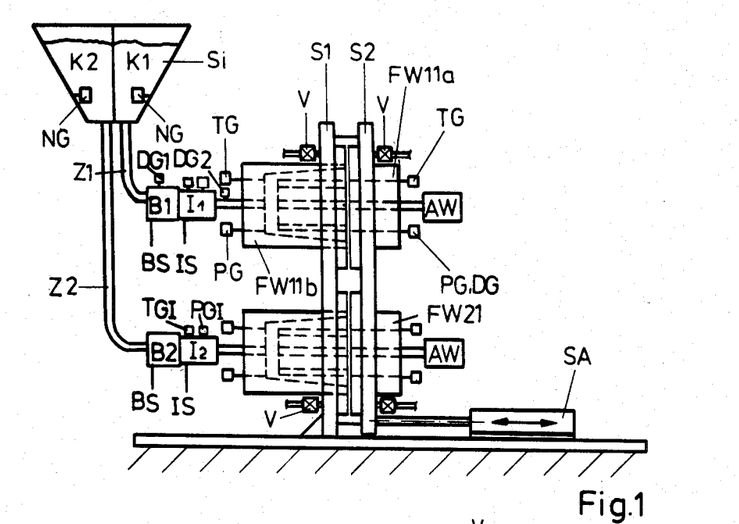
FIG. 1 is a side view of a device with several form tools with separate materials supplies.

FIG. 1 illustrates a device for simultaneously manufacturing several molded parts from different plastic K1, K2 A hopper Si is divided into chambers that are individually connected to injectors I1, I2 through feed lines Z1, Z2 that supply form tools FW11, FW21 with sintering material. Each form tool FW11, FW21 consists of two halves FW11a, FW11b, each of which is mounted in a shield S1, S2. A shield-drive mechanism SA can transport shield S2 with one mold half FW11a so that the castings can be removed or thrust-out by extractor AW subsequent to sintering. Swelling devices B1, B2 are mounted between hopper Si and injectors I1, I2.

Form tools FW11, FW21 communicate through process-dependent controlled valves V, of which there is a group for each mold half, with a supply and removal device VV for steam Da, vacuum Va, compressed air PL, cold water Kwz, and associated removal connections Es, KWr.

Figure 4:
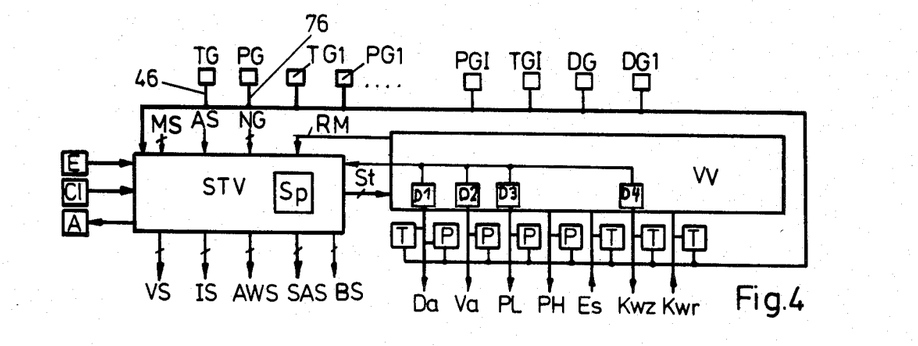
FIG. 4 is a circuit diagram of the controls and supply device, and FIG. 5(a) the chronological course of the control process and, on the same time scale below.

The form tools also have temperature transducers TG and pressure transducers PG and there are level transducers NG in the chambers in hopper Si that detect the presence of raw material K1, K2. There is also a distance transducer AS between shields S1, S2 or at shield-drive mechanism SA. All signal lines from these transducers are connected at the input wide with controls STV (FIG. 4).

Figure 2:
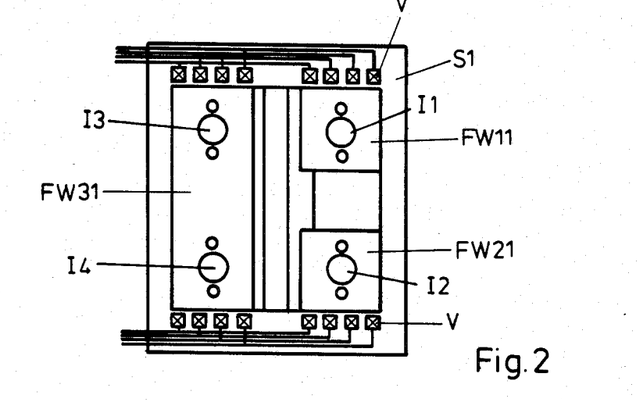
FIG. 2 is a front view of the same device without the materials supplies.

FIG. 2 illustrates how each mold half FW11, FW21, FW31 is spatially associated with a group of valves V. The mold halves are of different size and can be interchanged.

In contrast to the form tools FW11, FW21 illustrated in FIG. 1, form tool FW31 extends over the total height of the shield. This is illustrated only by way of example because the arrangement is extremely variable. Only the connections are installed fixed and standardized to allow simple and rapid refitting. Injectors I1-I4, ejector AW, and temperature and pressure transducers TG, PG are also easy to replace when refitting or, to the extent that they are permanently mounted in the tool, easy to attach to the controls. This is evident from the section of a form tool illustrated in FIG. 3. Injector I, pressure transducer PG, and temperature transducer TG are inserted into mold wall 11b, which surrounds mold cavity FH1 through media chamber 15b from rear wall 12b and ejector AW into mold wall 11a from rear wall 12a. The position is secured by tightening nipples 30a-d and the media are blocked off at the points of penetration by seals 31a-d, 52, 62, and 78. If the shafts 40, 50, 60, and 70 of the subassemblies employed are long enough they will match the widest possible range of form tools. Pressure and temperature transducers PG and TG are practically provided with an elastic length compensator to compensate tolerances in the mold half, especially when temperature and pressure vary. A pressure- or temperature-transducer element 75, 45 is fastened in the tip of a support 72, 42 that rests on a collar insert 72a, 42a on a compression spring 71, 41 against shaft 70, 40. Temperature-transducer element 45 extends into a bore 44 in mold wall 11b and pressure-transducer element 45 is positioned flush with the inside of the mold wall at mold cavity FH1 through a bore. Collar mount 72a rests on the chamber-side surface 111 of mold wall 11b. The signal lines 76, 46 from the transducers lead out through interior bores in supports 72, 42 and shafts 70, 40 and are connected to the controls.

Figures 3, 3A:
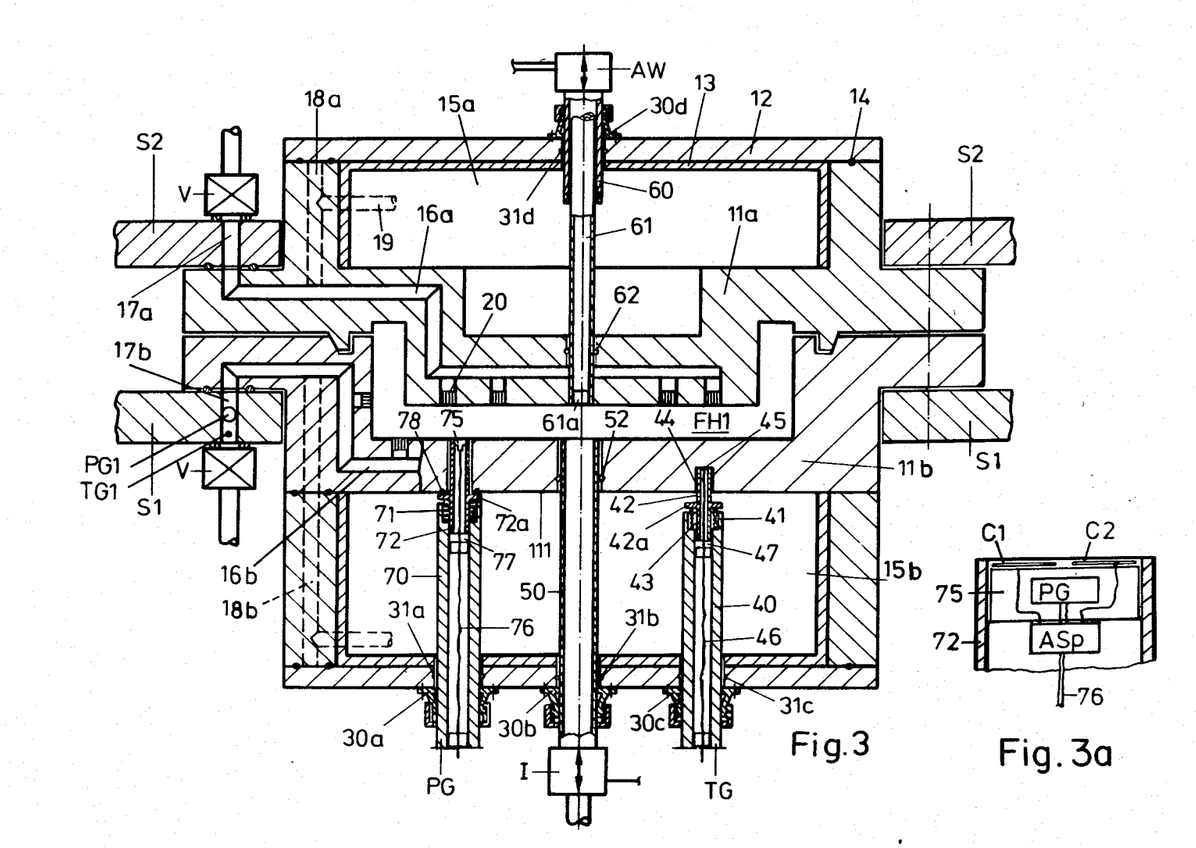
FIG. 3 is a section through a form tool.
FIG. 3a shows a transducer for the tool shown in FIG. 3.

Media channels 16a, 16b in each mold wall 11a, 11b lead from valves V on shields S1, S2 to nozzles 20 into mold cavity FH1. Other valves V communicate in a known way through bores 18a, 18b with steam distributors 19, cold-water distributors, and removal connections Es for condensate or cold water Kwr in chambers 15a, 15b. Since the various bores, valves, and distributors are in line, they are not specifically illustrated in the drawing.

Supply and removal device VV has the following specific connections:

The lines for sintering steam Da, compressed air PL, vacuum Va, and the removal Es of condensate are all separately controlled and communicate with media channels 16a and b.

The lines for heating steam Da, the supply of cold water Kwz, the removal Es of condensate, and the recirculation of cold water Kwr are each separately controlled through valves and communicate with the corresponding distribution or collection devices in chambers 15a, 15b.

The lines for filling mold cavity FH1 are each separately controlled and communicate with the lines for sintering steam, vacuum, and compressed air at the media channels.

The steam for sintering and heating can be variably supplied through a reduction valve (not illustrated) when practical.

Figure 5A:
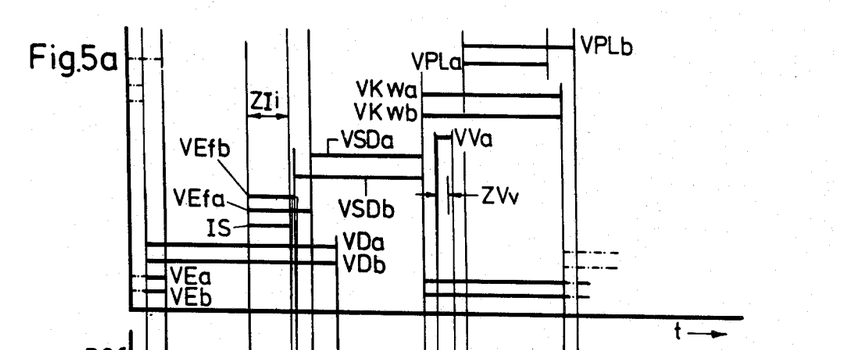

The removal Es accepts the condensate from the heating and sintering steam and the cold water as long as the wall of the mold is at a relatively high temperature. When cold water is being recirculated, it is conveyed into cold-water recirculation system Kwr, saving the costs of energy and water processing (not contained in FIG. 5).

FIG. 4 is a schematic representation of controls STV, the outputs of which control the various valves V, injectors I, ejectors AW, and shield-drive mechanism SAS through signal lines VS, IS, AWS, and SAS. The subassemblies of supply device VV are reverted over control lines St to controls STV over line RM.

Furthermore, flowmeters D, pressure transducers P, and temperature transducers T are positioned at supply device VV at the media outflows and lead along with pressure and temperature transducers PG and TG to the input of controls STV. Additionally, temperature and/or pressure transducers TG1, PG1, TGI and PGI, only one pair of which are illustrated in FIG. 3 for the sake of clarity, are practically positioned at the incoming or outgoing lines 17a, 17b and 18a, 18b etc. of the media channels or chambers.

This satisfies the assumption of monitoring function and of quantitative determination of the time constants of the sections of the overall system. The lines joining the supply device and the inputs into the chambers, the chambers and each input and output, and the removal line and device at the chamber are constantly monitored. The temperature transducer in the wall of the mold also supplies information about the flow of heat between the chamber and the wall of the mold.

Furthermore, the supply lines of the media channels and the paths through the media channels to the cavity of the mold are all monitored with input and output temperature and pressure measurements. In certain cases there is a transverse flow through the mold cavity from one media channel to the other. Two sections from the supply device to the mold cavity and thence to the removal device are then always aligned and can be individually monitored.

The time charts in FIGS. 5a–f show the temporal sequence of characteristic valve switching, important pressure and temperature curves, and the opening or closing path A of the mold halves for one control cycle at one form tool.

The horizontal lines in FIG. 5a illustrate the closure times of valves V. The indexes a and b indicate assignments to mold halves or mold walls 11a, 11b. The middle letters relate to the medium being controlled. Specifically, these are hot-steam condensate removal valves VEa, VEb, heating-steam valves VDa VDb, injector control IS, the removal valves VEfa, VEf b that communicate with the media channels, the vacuum valve VVa that communicates with the media channel, the cold-water valves VKwa, VKwb, and the compressed air valves VPLa, VPL b that communicate with the media channels.

Figure 5B:
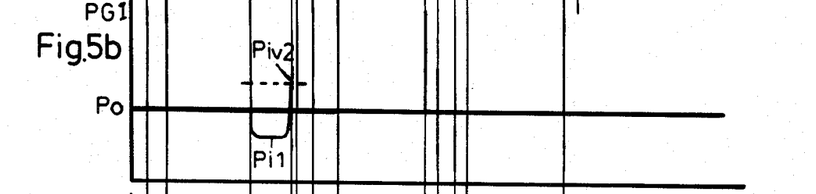
FIG. 5(b) shows the course of pressure in the injector.

FIG. 5b illustrates the sequence of pressure PGI in the injector as measured by pressure transducer PGI.

Figure 5C:
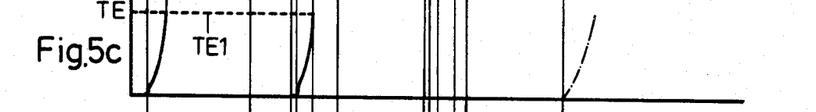
FIG. 5(c) shows the temperature of the condensate.

FIG. 5c illustrates the sequence of temperature TE as measured at the removal connection behind valves VEa, VEb and VEfa VEfb.

Figure 5D:
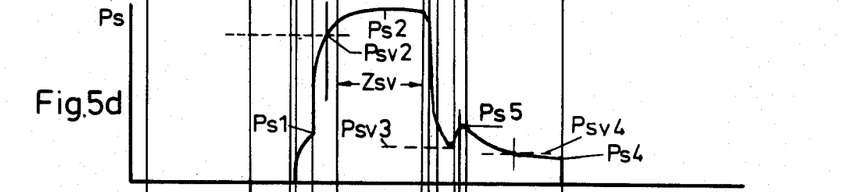
FIG. 5(d) shows foam pressure.

FIG. 5d illustrates the sequence of sintering pressure Ps in the mold cavity as measured by pressure transducer PG.

Figure 5E:
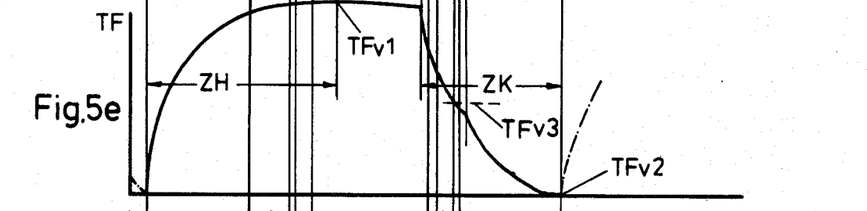
FIG. 5(e) shows tool temperature.

FIG. 5e illustrates the sequence of temperature TF in the wall of the mold as measured by temperature transducer TG.

Figure 5F:
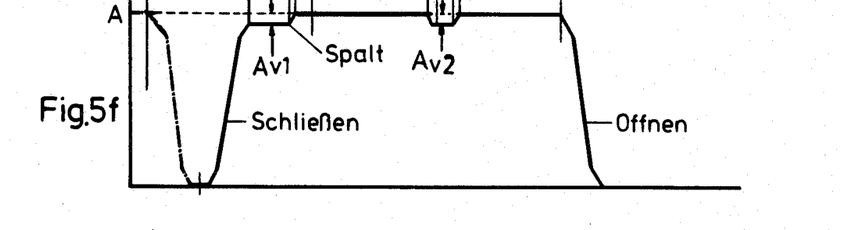
FIG. 5(f) shows the path traveled by the shield in opening and closing.

FIG. 5f illustrates the distance A between the mold halves as announced by the distance transducer by means of a signal AS.

The overlapping components of the previous and subsequent cycles are each represented with dot-and-dash lines. Heating up commences even while the form tool is opening by switching on hot-steam valves VDa, VDb. The sequence of temperature at the removal connections TE then indicates when the condensate reaches the given temperature TE1 of about 100° C. and no more condensate is forming. The condensate-removal valves Ea, Eb are each closed accordingly.

FIG. 5e illustrates the temperature sequence TF in one mold wall for this. The temperature sequence in the second wall is similar and is accordingly not illustrated. When comparisons are carried out, it is appropriate to select the higher or lower of the two temperature levels.

Once the sintered casting has been ejected, the mold is closed up to a predetermined gap Av1. As soon as distance transducer AS indicates this fact, the injector is activated and removal through the media channels connected to the mold cavity through valves VEfa VEfb. The filling air escapes for removal through the system. It is also possible to fill without a gap.

Once a rise in pressur-e to a predetermined level Piv2 is measured in the injector, or no later than a given time ZIi, the injector is turned off and the mold and injector closed absolutely tight. Removal valve Vefb is then closed and sintering steam conveyed to the mold cavity through valve VSDb and conducted transversely through the material to be sintered to removal, where condensate is diverted If the temperature TE of the condensate at the removal connection matches the predetermined temperature TE1 of about 100° C., removal valve VEfa is closed and sintering steam also turned on from the second side through valve VSDa.

During the transverse flow of the sintering steam a pressure builds up that increases with two-side steaming to full steam pressure. The level of this pressure is constantly compared with the valves at the supply devices and an alarm is released when the pressure buildup is too slow or unsatisfactory as the result of the expansion of the material being heated up in the flow of steam.

The foaming or sintering process can be monitored by means of the sequence of pressure Ps. An expansion pressure builds up immediately after the mold has been closed and climbs when the supply valves are completely closed about two atmospheres to foaming pressure Ps2. It is of decisive importance to the quality of the casting that the pressure Ps2 for a given sintering time Zsv be above a given sintering pressure Psv2, whereby the mold-wall temperatures TFa, TFb must simultaneously be above a predetermined level TFv1. Every time and as soon as this predetermined temperature is attained in the walls of the mold, the hot steam is turned off. The two halves of the mold can also be controlled in accordance with the latest attainment of temperature.

If the sintering process is discontinued when the given time Zsv has expired, the sintering steam is turned off and cooling turned on through valves VKWa and b, with removal being simultaneously opened. Pressure Ps must now be released in the casting as rapidly as possible below a given demolding temperature Psv4 as it takes for the wall of the mold to cool down to the given demolding temperature TFvw, which must be below the material's softening temperature. As soon as the upper or lower limits of these values are exceeded, cooling is terminated and the mold opened.

To accelerate pressure buildup without the sintering cake, which is still soft and filled with propellant, deforming excessively, the gap is opened to a given distance AV2 and vacuum is supplied to the cavity by opening valve VVA for at least a time ZVv to eliminate the condensate.

The mold is closed again when a given temperature TFV3, which is above the softening temperature, is attained.

The vacuum remains beyond given minimum time ZVv in order to accelerate pressure decrease and cooling until a given pressure Psv3 is attained. This can also be beyond the point at which the mold is closed. Further cooling and drying of the casting with compressed air follows if necessary by opening the valves VPLa, VPLB with such a slight pressure, of about 1.2–1.4 bars, that the casting is not compressed. Valve VPLb remains opens while the mold is being opened to reinforce ejection, whereby the pressure can be increased to several atmospheres. Once the casting is loose, the pressure drops, upon which the compressed air is turned off.

Since compressed air and, especially, vacuum are relatively expensive media, they are employed as briefly as possible and the maximum open-valve time monitored and an alarm triggered when the given pressures Psv2, Psv4 or temperatures TFv2, TFv3 are not attained within the given time range.

The combination of compressed-air reinforced casting cooling and mold closure and of vacuum reinforced pressure decrease and gap-reinforced pressure decrease is employed in cases in which is occurs at short cycle times. Each stage in the process is practical in itself alone and curtails the cooling phase and pressure-decrease phase and hence the overall cycle time.

The content of residual propellant in the sinter cake is determined from the increase in pressure to Ps5 subsequent to closing the mold. This results, for a given mass precision and surface quality on the part of the casting, the requisite drop in the predetermined demolding temperature TFv2 below the softening temperature.

The totality of the cycle time is minimal when the sum of heating time ZH, sintering time Zsv, and cooling time ZK is minimal and hence the opening and closing of the mold, filling, and pressure drop to a given sintering pressure correspond to no more than the heating time ZH for heating the wall of the mold to the given sintering temperature TFv1 and, furthermore, the pressure drop to the given demolding pressure Psv4 corresponds to no more than the time ZK the wall of the mold takes to cool the given demolding temperature TFv2.

The given sintering pressure Psv2, the gap width Av1, and the demolding temperature TFv2 are derived from material properties of the sintering material and from the required casting properties. Whether and how rapidly the sintering pressure Ps2 is attained depends on mold-wall temperature TF, propellant content, degree of filling, the mold- and material-specific time for forcing the air out of the try-cock volume, and sintering-steam pressure PD1. The time ZH needed to heat the wall of the mold to a temperature TFv1 depends on the thermal constants of time of the feed system and those of the mold as well as on the difference in temperature between the heating steam and the mold-wall temperature TFv1 to be attained.

In the case being described, slightly elevating the temperature of the heating steam can shorten heating time ZH until it ceases simultaneously with the attainment of the given sintering pressure Psv2.

If, on the other hand, the content of propellant in the material is lower, the pressure will increase more slowly and the aforesaid points of time will be closer together.

If, however, pressure builds up very slowly because there is very little propellant in the material, the given mold-wall temperatures and heating-steam temperatures must be reduced. This will increase the consumption of energy for heating and cooling, and both heating time ZH and cooling time ZK will increase.

The sintering time Zsv also depends on the material properties and is co-determined by the actual sintering pressure Ps2. Sintering time decreases with a high propellant content.

Softening temperature is higher and pressure decrease slower when propellant content is relatively low. Heating and sintering times or temperatures and sintering-steam pressure must accordingly be increased to a given level. Otherwise, pressure will drop more rapidly during cooling, and demolding can occur at a higher given temperature and hence after a shorter cooling time.

In addition to energy consumption and processing time, it is essential for overall economy for material with a lower molecular weight, which is easier to manufacture, to be processed in the device in connection with parts with lower demands on casting properties, simultaneously with material with other properties.

Since sets of packaging parts with different demands on casting properties are frequently manufactured, and since, on the other hand, the geometry of the different shapes always requires different cycle times, the material with a lower molecular weight or softening temperature can be employed in shapes with short cycle times and the higher-quality material employed simultaneously in the shapes with long cycle times. The times can then be optimized for the most unsatisfactory combination of material and shape. The cycle time that is accordingly given for all parallel processes in the other shapes will then be optimally divided into heating, sintering, and cooling times.

Another essential material parameter is powder density. This is determined by prefoaming and provides a standard for the density of the final product. Previously highly preswelled material requires a higher sintering pressure. The pressure decrease during cooling is also more rapid.

The density and strength of the finished piece derives from the relation between the powder density of the preswelled material and the given gap width in relation to the thickness of the casting, meaning relative compression subsequent to filling. If compression is high, the casting will be denser and stronger, but pressure decrease subsequent to sintering will be slower.

The pourability of the pre-swelled material is determined by moisture content and electrostatic charge. When pourability is poor, the mold can fill irregularly and cause the formation of holes and blowholes. The filling time can also apparently become shorter because lumping and blockage in the mold will result in a pressure buildup that simulates satisfactory filling. Monitoring the filling time serves to reveal this defect. The effects of low pourability can to a certain extent be corrected by increasing the gap width during the filling process. A thoroughgoing remedy against this type of malfunction is to be sought in control of the swelling process or post-treatment of the swelled material.

Another essential material property is relative moisture content because the object is to obtain castings that are as dry as possible in relation to the intended purpose so that no further drying must be undertaken downstream. The moisture content of the casting can be reduced by a higher sintering-steam pressure. The lower limit of sintering-steam pressure is the point at which interparticular bonding is no longer satisfactory and the upper limit is that at which the foam is destroyed by overheating.

The steam pressure must accordingly be as low as possible. Moisture can also be reduced by increasing the temperature of the tool.

The moisture content of the molded part can also be reduced during the cooling process by means of vacuum and/or compressed air to suction or blow off the water adhering to the surface, which can also flow off. The sintering-steam pressure is to be increased or sintering time Zsv and given vacuum time ZVv extended in accordance with increasing moisture in the foamed casting.

The various material data of several materials as determined by manufacture and processing, the various mold parameters of several shapes, and the differing casting parameters of casting properties demanded by various parts to be manufactured simultaneously constitute in conjunction with their interconnections such a complex problem for mathematical optimization with such a large number of variables that it becomes practical to break the optimization problem down into separate processing steps that can be carried out with a limited number of variables. The following method has proved to be especially practical:

1.1. Determining the material data of the unfoamed starting materials: molecular weight, propellant content, and softening temperature.
1.2. Prescribing the specific materials costs for steam, cooling, vacuum, and compressed air.
2. Determining the installation parameters: pressure and temperature time constants and operating-time costs.
3. Determining the mold parameters: pressure and temperature time constants, media throughputs, and operating-time costs.
4. Prescribing the casting parameters from casting quality density, strength, surface quality, moisture, damping, impact strength, dimensional stability, etc.
5.1. Selecting the practicable starting materials with respect to molecular weight and propellant content in accordance with the demands on strength and surface quality for the various parts.
5.2. Selecting from the starting materials determined in accordance with 5.1 the most cost-effective for each part.
6. Prescribing the powder density of the prefoamed materials in accordance with the density demand under 4.
7. Prefoaming the materials as dictated by 6.
7.1. Determining the material data for the foamed materials: powder density, moisture, pourability, and bead size.
7.2. Testing and possible correction to ensure that the givens in 6, 4, and 3 have been satisfied and until they have been satisfied.
7.3. Determination of propellant content, bead size, and pourability.
8. Determination of provisional given values for pressure, temperature, sintering time, and drying time for the processing sequences of all parts independently of each other and specifically from data in accordance with molecular weight and softening temperature, from the data from 7.1 and 7.3, and from the surface quality and moisture dictated by 4.
8.1. Calculating provisional cycle times from the values given in 8 and the parameters in 2 and 3 without considerations of cost.
8.2. Determination of the longest cycle time.
8.3. Optimizing the longest cycle time with respect to the costs in 2 and 3 by varying the givens in 8 and determining the final given values and given times.
8.4. Optimizing the given values for the remaining parts by varying the appropriate given values from 8, taking into consideration the costs in 2 and 3, with the cycle time determined from 8.3 being given.
9. Carrying out the sintering process with the values from 8.3 and 8.4 as givens and measurement of the actual values of pressure and temperature and the times for the process steps resulting from the given and actual values.
9.1. Comparison of the measured values with the values expected according to the mathematical optimization carried out in 8.3 and 8.4 and comparison of deviations with given upper and lower limits.
9.2. If there are deviations above or below the limits in 9.1—analysis based on the combination of simultaneous cases and/or the dimensions of the deviations as to whether and in what part of the device and operational malfunction exists accompanied by triggering of an alarm or as to whether the actual material data, especially propellant content and/or pourability, deviate from the values in 7.3 accompanied by triggering of an alarm, plus 9.3. Repetition of steps commencing with 8.4 or 8.3 with the actual material values from 9.2 or actual parameters resulting from the actual test values from 9.

Analysis designed along these lines will reveal malfunctions not only in the device itself but also in the prefoaming process or in material supply and intermediate storage separately and indicate them individually in the form of alarms.

In one practical embodiment of the device and method, the casting properties, moisture, strength, surface quality, dimensional stability, and density for example, are measured either at the form tool itself or at an instrument downstream from the foaming device, and these measured values MS are supplied to controls STV and compared with the given casting parameters. When the limits are exceeded in impermissible ranges, an alarm is triggered. If the differences are within a permissible range, they are exploited to control the process in determining the given values to decrease the tolerances.

In another practical embodiment of the device and method, the prefoamed material is conveyed to injectors I1 and 2 through swelling device B1, B2. These swelling devices consist of chambers that can be subjected under control to hot air, high frequency, or microwaves for the controlled drying, heating, and/or swelling of, especially prefoamed, material. If, for example, the moisture content of the casting is high, the material is pre-dried by supplying dry warm air. If the density and strength of the casting are higher than necessary, enough energy in the form of high frequency, microwaves, or hot air is introduced into the swelling device to produce swelling to the requisite density. Temperature is simultaneously monitored by temperature transducer TGI and the increase in particle size or decrease in the density of the material is on the one hand determined during the subsequent sintering process from sintering pressure Ps2 and/or filling time ZIi or on the other hand measured directly by densometers DG1, DG 2 that observe the flow of particles at the input or output of the swelling device.

The aforesaid measurement signals TGI, Ps2, ZIi, and DG1, DG2 are practically supplied to and evaluated by controls STV, subsequent to which the appropriate control signals BS are released in order to control swelling device B1, B2.

The employment of a swelling device in connection with a sintering device is practical in itself. The practical effect can be increased even more if the swelling device or its controls operates in conjunction with the instrumentation and controls of the downstream sintering device so that the overall optimization strategy of the process exploits both devices integrated.

The method of determining optimal given values described herein, the optimization method for shortening the cycle time accompanied by economical energy consumption by adapting overlapping process functions to the same time frame as given by the least desirable function, and the device for carrying out the methods are described by way of example and can be varied in accordance with special demands without departing from the principle behind the inventions.

The methods and device disclosed relate to separate inventions that can be very practically combined as described herein.

A relatively high number of transducers for pressure, temperature, moisture, distance, density, etc. are necessary to obtain all the requisite measured values. Wiring and processing can be simplified by utilizing, instead of transducers that supply the conventional measurement signals with a downstream measurement multiplexer and analog-to-digital converter, transducers that directly emit digital measurement signals, meaning transducers that operate on the basis of frequencies that can be measured with counters and that are generated by oscillating systems, by temperature- or pressure-dependent components like quartz crystals for instance.

A transducer like that illustrated in FIG. 3a can be innovatively and inventively employed. It consists of an oscillating circuit with capacitors C1, C2 sequentially or concentrically positioned on the wall of the mold or preferably spatially integrated into surface of pressure transducer 75 so that the mold cavity, the casting, or the sinter cake always constitutes the dielectric of the oscillation capacitor. The frequency of this oscillating circuit can be employed to determine the measured dimensions or states:

moistness or dryness of the mold surface, moisture content of the filled material,
softening or hardening state of the sinter cake, and
moisture and in certain circumstances density of the casting.

This state information can be utilized as an alternative or supplement to temperatures or pressure measurements to signal or trigger the initiation of sintering, the termination of drying or cooling, and the initiation of demolding. Furthermore, swelling devices B1, B2 and sintering can be controlled as described in the foregoing from the density and moisture of the final product.

Transducers of a capacitative type are also provided as density or moisture transducers DG1, DG2 at swelling device B1 or injector I1. The capacitors are positioned on both sides of the supply pipe so that the field will always encompass the flowing material. The electrodes that supply high frequency in the swelling device can also be employed as measuring electrodes, meaning that the high-frequency circuit itself functions as a measurement circuit and its frequency is evaluated.

These frequency counters are practically combined with the oscillating systems into one subassembly and equipped with a call-up memory that, as soon as it is triggered by an address with an associated serial address code, releases the measured value in the form of a series of digital signals received by the controls. Addressing can be carried out either over the measurement line or over a separate addressing line and known from data transmission technology. All transducers or groups of transducers are connected to one toroidal line system that commences at the controls. Each transducer is assigned its own address, which is stored in it or connected to the input of the subassembly by a code generator.

In addition to the simplicity of the installation and controls, there is an advantage in that the digital transmission prevents contamination of the measurement signals between the site of measurement and the point of signal conversion.

The constantly determined measured values are compared by a process-run program in the controls with the given values or with values determined by the optimization program by the method described herein and the adjusting components, the valves in the device for example, controlled in accordance with the results of comparison.

I claim:

1. A method of molding expandable plastic particles in consecutive process cycles, said cycle including (a) introducing said particles into a mold cavity, (b) heating the particles in said mold to fuse the particles together to further expand the particles and to form a molded foam, (c) cooling the resultant molded foam, (d) removing the molded foam from the mold cavity, wherein the improvement comprises providing the mold cavity with means to supply and remove air, cold water, steam and vacuum, providing means to measure the temperature and pressure in the mold and to generate and transmit temperature and pressure signals to a control means based on such measurements, providing a memory means for said control means, said memory means for storing given values for material data relating to properties of the plastic and mold parameters and for storing values of said signals from previous process cycles, continuously controlling the flow of the air, cold water, steam and vacuum by the control means by comparing the temperature and pressure signals during each cycle and determining resulting control signals, further by comparing said given values and the measured values from the current process cycle, providing a storage in said control means for resulting cycle time lengths of the control signals of current process steps, and changing the cycle time length process cycle by process cycle by comparing the current and the earlier cycle time lengths and setting the related given stored values in the direction of decreasing the total process cycle time for the next cycle, and analyzing given upper and lower limits of the given values and the given time limits for the control signal lengths.

2. A method according to claim 1, which further includes prefoaming the particles before introducing the particles into the mold, said control means controlling the temperature and/or duration of prefoaming the plastic depending on stored given values, such values being set depending on a comparison of the last total cycle time compared to the earlier total cycle times, in the direction of reduction of the total cycle time of the next cycle by analyzing given upper and lower limits of the given values and the given time limits for the control signal lengths.

3. A method according to claim 2, which further includes providing a first density sensor means to determining the density of the particles during prefoaming, said first density sensor means connected to the control means wherein a correlated given density value is stored which is continuously compared to the sensed density value and the result of the comparison is used for the control of the prefoaming, said given density value being set depending on a comparison of the last total cycle time compared to the earlier total cycle times in the direction of reduction of the total cycle time of the next cycle, by analyzing given upper and lower limits of the limits of the named given values and given time limits of the control signal lengths.

4. A method according to claim 2, which further comprises providing a second density sensor means to be in contact with the foaming plastic in the mold or is in contact with the molded part, the second density sensor means being capable of generating a signal based on the density sensed, said signal being conveyed to the control means where the measured density value is compared to a given stored density value, the result of the comparison being employed for the control of the operation temperature or exposure time during the prefoaming for minimizing the difference of density values measured and stored.

5. A method according to claim 1, which further comprises providing a moisture sensor means to be in contact with the foaming plastic in the mold or is in contact with the molded part, the moisture sensor means being capable of generating a signal based on such moisture sensed, and signal being conveyed to to the control means where the measured moisture value is compared to a given stored moisture value, the result of the comparison being employed to modify the given pressure and temperature values in the direction of minimizing the moisture content.

* * * * *